United States Patent Office 3,046,170
Patented July 24, 1962

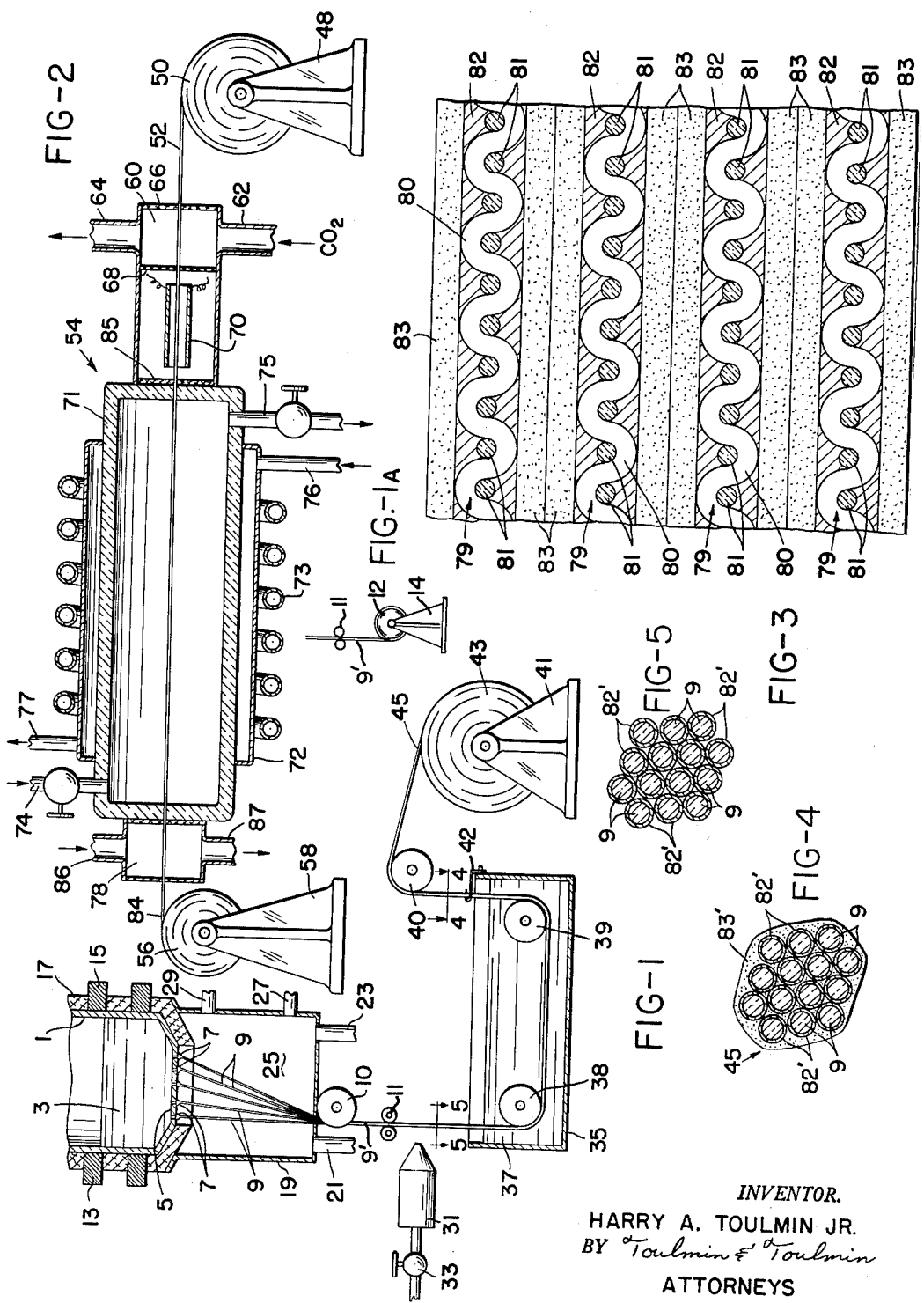

3,046,170
LAMINATES OF METAL PLATED GLASS FIBERS
AND METHODS OF MAKING SAME
Harry A. Toulmin, Jr., Dayton, Ohio, assignor, by mesne
assignments, to Union Carbide Corporation, New
York, N.Y., a corporation of New York
Filed June 1, 1954, Ser. No. 433,604
23 Claims. (Cl. 154—43)

This invention relates to formation of structural components such as sheets, rods, beams, blocks and the like.

A principal object of the invention is to provide a laminated structure of a polyester polymer resin and a metallized siliceous or glass fiber of such character as to provide a smooth surface which may be decorated or is self-decorative and is highly resistant to atmospheric attack.

A primary object of the invention is to provide a novel composite body of metallized siliceous or glass fibers and a resin, which body is highly impermeable to moisture even under widely varying conditions of temperatures and pressures.

It is an additional object by the use of a combination of a metal adherent resin, e.g. a resinous polymer of a polyester and a metallic plating on glass fibers to provide a product that is fireproof, that has no projecting fibers through an applied industrial finish coating and which can be manufactured rapidly.

Heretofore glass fiber laminates have been made by a relatively slow molding process in which the glass fibers and the resins are placed in a mold and subjected to a vacuum to cause the body of fibers and resins to conform to the mold shape; then a die is inserted in the mold against the fibers and heat supplied. After the glass fiber-resin combination has been set by heat then the surplus portion of the fibers and resins must be trimmed by hand. The present process for making laminates where they are molded to particular shapes is slow, tedious and substantially a hand operation with high labor costs. It is not adaptable to mass production with platens and dies at high speed.

Furthermore a very particular problem associated with the usual laminates of glass fibers and resins, including the polyester resins, is the tendency of the completed laminate to pick up moisture; this tendency is principally due to the ability of the filaments or fibers of glass to acquire moisture:

(1) By capillarity between the filaments;
(2) By surface absorption; and
(3) By absorption in any textile size on the filaments, or attraction of the resin itself for moisture.

Volume absorption of moisture into the glass does not occur and the moisture in fact is usually relatively low, but is sufficient to disrupt, under service conditions, the bond between the glass and the resin, and where the service conditions include exposure to constantly varying stresses and atmospheric conditions, the moisture factor is an extremely important one. For example, laminated components are subject to relatively rapid deterioration when utilized in high altitude aircraft, and in some component parts where the safety factor is required to be high, such laminates are not used because of the possibility of bond weakening.

The instant invention by use of metal plated glass fibers in combination with a polyester resinous polymer that is metal adherent makes it possible to overcome the above noted difficulties; thus it is now possible to deliver an assembly of metallized fibers and the resins to a high speed hot platen press for formation and shearing thereof like any other piece of metal or sheet stock, and therefore this invention provides for the first time, a glass fiber-polyester combination as a new structure capable of being used on existing high speed mass production machinery. The smooth metal surface plated on the glass fiber enables it to be formed in such presses, without breaking, like any other metal body or sheet, and the metal compact serves as a lubricant between adjacent strands of the fragile fibers.

The metallizing of the fibers is further important in two major respects, firstly, the metal prevents the ingress of moisture to the siliceous fibers and the metal itself is in a very pure state and is not corroded by moisture which may reach the same; secondly, the resins, particularly the polyesters and most particularly the polyesters polymer which comprise a polymerizable alkyd resin and a vinyl-substituted heterocyclic tertiary amine, wet the metal more readily than resins wet glass, and accordingly an adherent bond of the metal is established in the uncured state of the resin; this adherence occasions a materially lesser flow of the resin under pressure conditions during cure and minimization of the tendency of the resin to flow also results in minimization of fiber distortion under pressure, thus permitting more accurate molding operations with lesser amounts of trim in, for instance, compression molds.

The metallized siliceous fibers are also capable of extrusion with the resin, which is again considered to be due to the adherence of the resin to the metal, which permits the resin coated metallized siliceous body to flow substantially as a unit under the extrusion action.

Thus the present invention eliminates the particular problem now existing of securing a high degree of adherence between a glass fiber and a polymer of a polyester to render the composite useful in extrusion applications.

Thus the adherence of the polymer of the polyesters to metal, particularly the polyester polymers comprised of a polymerizable alkyd and a vinyl-substituted heterocyclic tertiary amine, is of considerable importance in this invention. The specifically mentioned polyester polymers are described in detail in co-pending application of M. J. Hiler and P. Q. Peake, Serial No. 338,155, filed February 20, 1953, now abandoned, and assigned to the same assignee as the present invention; the specific resins will be referred to more particularly hereinafter.

This invention also eliminates by the use of metallized fibers in the metal adhering resins the normal tendency for glass ends to protrude from the composite completed body. Thus frequently in the preparation of laminates, and most particularly where pressures of any degree are used, the small fibers of the glass tend to fracture and to protrude from the laminate. This occurs often where industrial finishes such as paint and the like are applied to the laminated body, for glass fibers do not readily adhere to these industrial finishes.

The glass or siliceous material utilized in the practice of the invention is preferably non-alkaline, and most suitable for glass application is a glass which is normally utilized in electrical applications. However alkaline glasses are suitable although their tendency to moisture absorption is greater and more care must be exercised in the preparation of the laminate.

The metals employed on the glass fibers in the practice of the invention are deposited from heat decomposable metal bearing gaseous compounds. A process for gas plating glass filaments or fibers is disclosed in my prior application Ser. No. 294,774, filed June 21, 1952. For this purpose the carbonyls are most suitable since they decompose at relatively low temperatures, well below the softening point of substantially all the glasses, and are readily available; iron pentacarbonyl, nickel carbonyl and chromium hexacarbonyl are very suitable, although it is to be understood that this listing is not exclusionary.

Other heat decomposable gaseous metal bearing compounds are very useful as set out more particularly hereinafter.

The polyester resins which are preferred in the practice of the invention are those described in the above referred to co-pending applicaiton and include polymerizable vinyl-substituted heterocyclic tertiary amines with an alkyd obtained from the combination of glycol or propylene glycol, and an unsaturated di-carboxylic acid, or mixtures of such acids, including maleic and phthalic acids. Such polyester polymerizable compositions may be readily formed to shape in a partially set condition and then cured preferably with catalyst such as benzoyl peroxide or succinic peroxide to heat hardened condition, the resins being particularly notable for their adherence to metal and their high impact strength.

Examples of the vinyl-substituted heterocyclic tertiary amine include 2-vinylpyridine, 5-vinyl-2-methylpyridine; and 5-ethyl-2-vinylpyridine; also useful are vinylpyridines and their alkyl nuclearally substituted derivatives in which the alkyl radicals contain 1 to 4 carbon atoms; the vinylimidazoles, the vinylquinolines, the vinyl-isoquinolines, and so forth.

Other polyesters having bonding agent properties such as the unsaturated alkyds copolymerized with styrene which are clear liquid thermosetting resins are particularly useful.

Polymerization inhibitors may be utilized in the customary manner to preserve the resins suitably during storage and such include guaiacol, paraquinone, hydroquinone to the extent of about 0.2 to 1.0 percent by weight of the blend.

For the purpose of the detailed explanation which follows the glass will be assumed to be E glass, which is a normal industrial glass of commerce adapted for electrical insulation purposes of substantially non-alkaline nature; however, other glasses particularly the low expansion borosilicates, all-silica products (also low expansion) are extremely useful. In general the metal film is effective to substantially completely exclude moisture from the metallized glass fibers, and accordingly the alkaline glasses are also employable and are of particular importance where the metal film is thin—that is less than 1 mil—the adherence of glass or all metals being very high despite the greater expansion tendency of the alkali glasses. With thicker metal films the glass and metal should be of about the same expansion characteristics for optimum results. The presence or absence of a lubricating or bonding agent on the fibers in small amounts does not materially affect the glass fiber-metal adherence.

The invention will be more fully understood by reference to the following detailed description and accompanying drawings where:

FIGURE 1 is a schematic view illustrating apparatus for the formation of strands of siliceous fibers, the metallizing thereof, and the coating of the metallized strands with resin, the apparatus being adapted to effect partial curing of the coated resin if desired;

FIGURE 1A illustrates a modification of a portion of the apparatus arrangement of FIGURE 1;

FIGURE 2 is a schematic view of apparatus illustrating the method of metallizing siliceous fabrics to which resin coats are to be applied;

FIGURE 3 is a sectional view illustrating a glass fabric impregnated with metal which latter is coated with a resinous polyester;

FIGURE 4 is a sectional view taken on line 4—4 of FIGURE 1; and

FIGURE 5 is a sectional view taken on line 5—5 of FIGURE 1.

Referring particularly to FIGURE 1 there is indicated at 1 a platinum pot which contains a body of molten glass 3; the glass in the present instance may be considered to be E glass having a working range temperature of approximately 2100–2200° F. The base of the pot 5 is provided with apertures through which the molten glass exudes as indicated at 7 to be drawn into filaments 9 and gathered over guide roll 10 into roving form; the rotation of drawing rolls 11 which are driven by suitable means (not shown) effect the drawing.

The platinum pot 1 is heated electrically by means of electrodes 13, 15 energized from a suitable source; other heating means known to the art may be utilized to retain the glass body 3 in a molten condition. The platinum pot 1 is provided with insulation at 17 and suitably supported against the insulation is a tube 19 through which the drawn filaments pass. The tube 19 is provided at the lower end thereof with inlet ports 21, 23 for the passage of an inert carrier gas in considerable volume into the chamber 25 defined by the tube 19. The lower end of the chamber is also provided with an inlet port 27 for the inward passage of heat decomposable metal bearing gases, which in the present instance may be considered to be iron pentacarbonyl and which gas mixes with the inert gases and is assisted thereby to intimately engage the moving filaments. The upper end of the chamber is provided at 29 with an outlet which is connected to a suitable motor driven vacuum pump (not shown) and exhaust gases of the thermal decomposition effected, as well as the inert gases are withdrawn, through this outlet and in no way hinder filament formation.

Positioned below the tube 19 is a nozzle 31 having a conduit containing a valve 33 and the nozzle is adapted to direct an intense air flow against the lower portions of the drawn filaments as they pass downwardly when a cooling effect on the filaments is desired and when valve 33 is open.

Shown in the lower portion of FIGURE 1 is a tank 35 having therein a liquid polyester. This polymerizable liquid composition comprises a blend of an alkyl resin with a vinyl-substituted heterocyclic tertiary amine as described in the aforementional application of Hiler et al.—in the present case the polymerizable composition is composed of 100 parts of an alkyd resin constituted by glycol, maleic acid and phthalic acid, and about 30 parts of a vinyl-substituted heterocyclic tertiary amine and about 1.5 percent by weight of benzoyl peroxide as catalyst.

Rotatably supported within the tank are pulleys 38, 39 over which drawn filaments may pass to a pulley 40 supported outside of the tank above the polyester composition. Rightwardly as shown in FIGURE 1 there is provided at 41 a stand on which there is rotatably mounted a reel 43 adapted to be driven in synchronism with the drawing rolls 11 to have wound thereon resin coated metallized glass filaments 45.

In the operation of the equipment shown in FIGURE 1 glass exudes from the molten body 3 as indicated at 7 and is drawn into fine filaments 9 by the drawings rolls 10; the inert gases flowing in through ports 21, 23 provide an atmosphere of carbon dioxide, for example, within the chamber 25 and heat decomposable gases of pentacarbonyl entering at 27 are mixed therewith and urged into contact with the hot drawn filaments to deposit thereon a coating of iron; the filaments assuming the general form shown in FIGURE 5 where the filaments 9 are indicated to be coated with metal 82'. The exhaust gases as already noted are withdrawn through port 29 and the filaments pass downwardly toward the tank 35.

The filaments themselves cool rapidly but do contain a degree of residual heat and when valve 33 of nozzle 31 is in the inoperative position the metallized filaments formed into a single (FIGURE 5) group of parallel strands and lubricated with respect to each other by the metal coating each of the filaments, by their passage over rolls 38, 39 are coated with resin 37. The residual heat is sufficient to partially set the resin as the strand moves through the resin bath and is wound upon reel 43 and if retained on the reel the residual heat is highly effective for this partial setting; while not generally necessary wipers may be employed at the exit of the bath to remove excess liquid resin. If it is not desired to have the resin partially set during the preparation of the resin coated metallized filaments valve 33 may be opened and a cold blast of air swept across the metallized filament and the residual heat will be withdrawn therefrom, providing a completely uncured coated product on the reel 43 (FIGURE 4). Thus as as 45 shown in FIGURE 4 the filaments 9 are coated with metal 82' and the resin 83' coats the same and enters the spacing therebetween.

The partially cured and the uncured resin coated metallized siliceous fibers may be utilized in the formation of laminates by simply placing the required amount of the material together in any suitable form and compacting the same under pressure and at low heat, for example, 300° F. Alternatively fibers collected on the reel 43 may be chopped and utilized for extrusion purposes or they may be formed into loose woven materials prior to final curing of the resins.

It is to be noted in connection with chopped fibers that glass ends may be exposed during the chopping but moisture will not be picked up by the glass since it itself is non-hydroscopic and the small surface area of glass exposed by such open ends is such that no deleterious results will be encountered. Further, due to the slight flow which takes place during the curing operation these glass ends will be completely sealed and protected in the final product.

Referring now to FIGURE 2 there is shown therein apparatus for the metallizing of glass yarns, glass fabric and similar fabricated lengths of material. Shown at 48 is a stand having a reel 50 on which there is wound a glass yarn 52 which is drawn through the apparatus indicated generally at 54 and wound upon a reel 56 supported on stand 58. Reel 56 is driven by means (not shown).

It is to be understood that equipment such as that described in FIGURE 2 may be employed to metallize a plurality of yarns simultaneously or even fabrics.

Yarn 52 when drawn passes into a first chamber 60 in which an atmosphere of an inert gas such as carbon dioxide is maintained by passage of the gas through conduit 62 upwardly through conduit 64 to vacuum. Yarn 52 in its passage into the chamber passes through small openings in sealing members 66, 68 and the pressure within the chamber is higher than atmosphere to prevent ingress of air to the yarn.

A chromolux heater which comprises an electrical resistance element is secured in position at 70 and serves to heat the yarn 52 as it passes therethrough. The heater heats the yarn to a temperature which is at least that of a heat decomposable gas bearing metal with which the yarn is to be plated, and in the present case the yarn may be considered to be heated to about 500° F., the metal bearing gas to be employed being nickel carbonyl.

Leftwardly of the heating element 70 and sealed airtightly to the chamber surrounding the same is a glass tubular member 71 surrounded by a water jacket 72 which in turn is surrounded by an induction heating coil 73; if desired the heating element chamber may be glass and integral with member 71. The tubular member 71 is provided at 74 with an inlet for the passage of heat decomposable metal bearing gases, such as nickel carbonyl, and an outlet 75 is provided for the exhaustion of gases from the tubular member, the outlet being connected to a source of vacuum (not shown). The water jacket 72 is provided with an inlet 76 and an outlet 77 and water courses through the jacket to maintain the internal wall of tubular member 71 cool to inhibit the deposition of metal thereon.

The yarn heated by the heater 70 to about 500° F. passes suitably at a rate of about 50 ft. per minute into the chamber of the tubular member 71 which has been exhausted of all air and filled with the heat decomposable nickel carbonyl. As the yarn strikes the nickel carbonyl atmosphere which is continuously coursing through the chamber the gas decomposes and a coating of nickel forms on the moving yarn. The yarn then passes into the field set up by the induction coil 73 which is supplied from a suitable source (not shown) and the nickel on the fiber is heated to maintain the temperature of the glass yarn for its complete passage through the chamber above that of the heat decomposable temperature of nickel carbonyl and preferably at a temperature of between about 350° F. and 400° F. As the yarn traverses the chamber a coating of metal deposits thereon and very suitably has a thickness of about 0.001 inch.

The thickness may be controlled by controlling the speed of yarn passage, higher speeds contributing to finer films; also the metal bearing gas may if desired be diluted with an inert carrier gas such as carbon dioxide to effect control of the deposition.

In its passage to the reel 56 the metallized yarn passes outwardly through the sealing chamber 78 which is provided with an atmosphere of carbon dioxide continuously flowing inwardly through port 86 and outwardly through port 87. The pressure within the chamber 78 is higher than that of atmosphere and consequently no air flows into the interior of the tubular member 71 and any slight amount of carbon dioxide flow thereinto does not materially affect the process. The metallized yarn is then wound on reel 56 and is ready for coating with a polyester.

It is to be noted that it is preferable to provide a seal at 85 to maintain the chromolux heater in an atmosphere of carbon dioxide in order to prevent the ingress of plating gas to the heater. This conserves the heater and lessens the maintenance required, which may become excessive if the nickel is permitted to deposit on the heater itself.

It is also to be noted that the yarn on reel 56 is, during the course of heating in its passage through the chromolux heater and through the field of the induction coil, rendered substantially free of moisture and the metal coat deposited while the yarn is thus freed prevents the ingress of further moisture when the yarn is subjected to conditions of use.

The metallized yarn may be utilized in strand form, may be woven into cloth of a loose knit or of a tight weave, or may be chopped or otherwise physically treated prior to application of the resin, and the resin may be applied in any suitable manner consistent with the form of the metallized glass; also the metallized yarn, fabric or roving (FIGURE 4) coated with a partially set or unset resin may be formed in any desired manner prior to rigidizing the product by complete setting of the resin.

Curing temperatures are preferably between about 50° and 200° C. depending upon the catalyst selected and the quantity employed.

Referring to FIGURE 1A, if desired, the metallized filaments from rolls 11 may be wound at 12 on a reel supported on stand 14; the filaments may then be stored for subjection to the resin at a later time.

Referring now to FIGURE 3, there is shown therein a fabric 79 of glass having longitudinally extending warped threads 80 and filler threads 81. Metal, for example, iron, deposited from iron pentacarbonyl on the fabric prior to formation thereof in the manner described in connection with FIGURE 2, coats the components of the glass, intimately engaging the same to provide a uniform smooth glass adherent coating.

Shown over the metal coating is the monomeric polymerizable resin 83 which may be any suitable alkyd in combination with 4-vinyl-2-methylpyridine for example. Such fabric pieces of suitable size may be stacked together and readily cured in the usual compression molding manner. Since the resin wets the metal and does not flow unduly the fabric will not be stressed excessively by the application of even high pressures. However, it is to be noted that with the polyesters generally and particularly with the preferred polyesters of this invention contact curing may be attained as with the usual polyester-glass laminates.

The product of the invention, that is the laminate or plastic resin-coated siliceous body, may be formed in any desired manner and is particularly applicable to high speed operations, compression molding and extrusion, whether the glass fiber be in the form of rovings, woven or non-woven fabrics, and whether the form of the coated polymerizable material be that of a strand, a chopped condition, or a sheet. The product in either the set or unset condition may be sheared readily.

A particular feature of the product of invention involving the metal coated glass or siliceous fibers and the metal-adherent resins is the complete coating of the metal by the resin to the extent that, particularly in rovings, the resin separates the metallized fibers quite completely. In thin sheets this factor is important as the resin coated metallized fibers are even in the cured form flexible and may be bent or twisted to desired shapes under pressure. The separation of the fibers by the resin insures against fracturing of the fibers and retention of the integral metal film. This feature is also important where the resin coated metallized fibers in single layer or laminate form are to be subjected to high impacts.

This invention in utilizing a metal coated glass fiber plus the polyester resin, preferably of metal-adherent character, opens up the opportunity to use glass laminates with existing equipment on a mass production scale in a great variety of forms and shapes, and the ability to take an industrial finish of any conventional type that is usually applied to metal is important. Thus in mass production industries as well as smaller industries it is unnecessary to have special paints or surface treatments.

In the aircraft industry this product, because of its metal coating, is adaptable, without further coating, to fuselages and the like, and to wings also, because it is non-corrosive and has such a smooth surface; when it is in its final condition the metal itself can be deformed under pressure so as to form a very thin laminate of high strength and light weight with all the advantages of metal, with substantially the lightness of glass fiber and with a non-corrosive coating.

The product of invention utilizing the resins of the Hiler et al. application referred to hereinbefore is transparent and the metallized fibers may be clearly viewed. For many structural purposes this presents a distinctive appearance and the product has accordingly much utility in instrument casings, cabinets and such articles of manufacture.

In relatively thin sheet form the product has a good degree of flexibility and is sufficiently resilient to permit it to absorb a sharp blow without fracture; in block form the rigidity increases materially approaching the inflexible.

Whether in thin sheet form (where the thickness of the glass may be about a tenth of an inch while the thickness of the metal is one mil the product being coated over all with resin) or in block form (where a plurality of the thin sheets are plied together) the product may be cut cleanly through with a saw, for example, without material fraying of the glass fibers; and the raw edge created may be simply painted with more resin to protect it. Such products may be mechanically worked also, that is drilled through cleanly, for example. Further the products will retain nails and screws and other mechanical fasteners.

The surface finishes which may be applied to the resin are useful to provide it with further novel characteristics which appeal to the eye, particularly when the transparent resins, which permit of viewing the metallized fibers, are employed.

It will be understood that this invention is susceptible to modification in order to adopt it to different usages and conditions and accordingly it is desired to comprehend such modifications within this invention as may fall within the scope of the appended claims.

I claim:
1. In a process of providing a plastic woven impregnated glass fiber product, the step (a) of drawing said glass fibers from a molten source of glass, the step (b) of gaseous metal plating said fibers while being drawn, the step (c) of weaving the glass fibers so coated with metal, and the step (d) of impregnating and enclosing the woven structure with a polyester polymer resin, said resin forming a substantially continuous phase.

2. In a process of providing a plastic woven glass laminate, the step (a) of drawing said glass fibers from a source of molten glass, the step (b) of gaseous metal plating said fibers while they are being drawn, the step (c) of weaving the glass fibers so coated with metal, the step (d) of impregnating and enclosing the woven structure with a thermo-setting polyester polymer resin, and the step (e) of forming the woven structure to shape and simultaneously heating the structure to set the resin.

3. In a method of forming a plastic glass fiber laminate, the step (a) of forming hot glass fibers by drawing said fibers from a glass pot of molten glass, the step (b) of subjecting the hot fibers to a thermally decomposable metal bearing gas and depositing the metal from the gas on the fibers due to the heat of the fibers, the step (c) of thereafter covering the fibers with a sheath of metal-adherent polyester polymer resin in unset condition, and the step (d) of heating said resin on the fibers to convert it from the unset to the set condition.

4. A transparent plastic product of an article of manufacture, comprising a metal coated glass fiber and imbedded in a heat-cured polyester polymer resin comprising an alkyd and 2-vinyl pyridine bonded to the metal.

5. A transparent plastic product of an article of manufacture, comprising a metal coated glass fiber imbedded in a heat-cured polyester polymer resin comprising an alkyd and 5-ethyl-2-vinyl pyridine bonded to the metal.

6. A new article of manufacture comprising a laminated structure consisting of metal coated siliceous fibers having an outer covering layer consisting of heat curable polyester resin which is adherent to said metal coated fibers.

7. A new article of manufacture comprising a laminated structure consisting of metal coated glass fibers having an outer layer consisting of heat curable polyester resin which is adherent to said metal coated glass fibers.

8. In a method of forming a plastic glass fiber laminate, the step (a) of forming hot glass fibers by drawing fibers from a glass pot, the step (b) of subjecting the hot fibers to a metal bearing gas and depositing the metal from the gas on the fibers due to the heat of the fibers, the step (c) of thereafter covering the fibers with a thin film of metal-adherent polyester polymer resin in at least a partially unset condition, the step (d) of extruding the resulting composite product into a desired configuration, and the step (e) of heating said resin on the fibers to convert it from the unset condition to the set condition.

9. A new plastic article of manufacture comprising a laminated structure consisting of uniformly metal coated silica glass fibers having an outer covering sheath consisting of a polyester resinous bonding agent which is adherent to the metal coated fibers.

10. A new plastic article of manufacture comprising a laminated structure consisting of uniformly metal coated silica glass fibers enclosed in a heat-curable resin coating which is adherent to the metal of the fibers.

11. A new plastic article of manufacture comprising metal coated glass fibers and a heat-curable resinous polymer of a polyester, enclosing and separating the fibers, said resin being metal adherent.

12. A new plastic article of manufacture comprising a metal coated glass fiber and a polyester polymer resin bonding agent forming an outer sheath for the metal coated fiber and sheathing the same.

13. A new plastic article of manufacture comprising a glass fiber substantially free of moisture and having a metal coating completely covering and enclosing the same, and a polyester polymer resin forming an outer sheath for the metal coated glass fiber, said resin being metal adherent.

14. A new plastic article of manufacture comprising a unitary body of metal coated glass fibers which are assembled in a predetermined pattern in juxtaposition to one another and entirely covered with a polyester polymer resin.

15. A new plastic article of manufacture comprising a plurality of substantially parallel metal coated glass fibers which are assembled in juxtaposition to one another and each coated with a metal adherent resin, the resin being sufficient to entirely cover and enclose the metal coated fibers.

16. A new plastic article of manufacture comprising a molded body composed of metal coated glass fibers and a metal adherent polyester polymer resin bonding and enclosing the coated fibers together, said resin forming a substantially continuous phase with said metal coated fibers being embedded therein.

17. In a method of forming a plastic composite body the steps: (a) of gaseous metal coating individual silica glass fibers, (b) of applying to an assembly of said fibers a polyester polymer resin in sufficient amount to cover and entirely enclose the same, and (c) of converting said resin under heat to a set condition in association with said metal coated fibers.

18. In a method of forming a plastic composite body, the steps: (a) of producing a glass fiber, (b) of gaseous metal coating the fiber as it is produced, (c) of embedding the metal coated fiber in a polyester resin, and (d) of heating the composite body to convert the resin to a set condition securely bonded to the metal on the fiber.

19. In a method of forming a plastic composite body, the steps: (a) of producing a silica glass fiber, (b) of gaseous metal coating the fiber as it is produced, (c) of coating and enclosing the metal coated fiber with a polyester polymer resin, and (d) of heating the composite body to convert the resin to a set condition and simultaneously forming the body into a predetermined shape.

20. In a method of forming a plastic glass fiber laminate, the steps of coating the glass fibers with a metal deposited by gas plating, covering the metallized glass fibers with a polyester polymer resin that is metal adherent, plying the coated fibers together to form a laminated body, and subjecting the body to heat to convert the resin to a set condition.

21. In a method of forming a plastic fibrous coated product the steps of drawing siliceous glass fibers from a hot molten siliceous body, passing the fibers through a chamber having an atmosphere containing a heat-decomposable gaseous metal bearing compound while the fibers are still hot to utilize the heat of the fibers to cause the metal of the gaseous compound to deposit the metal as a continuous film of metal on the fibers, and applying a polyester polymer resin to the fibers to form a resinous sheath thereover while they retain residuary heat and are at a temperature effective to cause setting of the resin on the metal coated fiber.

22. In a method of forming a plastic fibrous coated product the steps of drawing siliceous glass fibers from a hot molten siliceous body, passing the fibers through a chamber having an atmosphere containing a heat-decomposable gaseous metal bearing compound while the fiber is still hot to utilize the heat of the fibers to cause the metal of the gaseous compound to deposit the metal as a continuous film of metal on the fibers applying a polyester polymer resin to said fibers, to entirely enclose the same while they retain residuary heat and are at a temperature effective to cause setting of the resin on the metal coated fibers, and simultaneously forming the set-coated glass fibers into a useful product.

23. A new article of manufacture comprising a laminated structure which is flexible and having a relatively high impact strength, said laminated structure comprising metal coated siliceous fibers having an outer layer of heat-curable polyester resin which is adherent to said metal coated siliceous fibers.

References Cited in the file of this patent

UNITED STATES PATENTS

| | | |
|---|---|---|
| 2,419,440 | Delmonte | Apr. 22, 1947 |
| 2,458,243 | Biddle | Jan. 4, 1949 |
| 2,575,265 | Fiedler | Nov. 13, 1951 |
| 2,577,205 | Meyers et al. | Dec. 4, 1951 |
| 2,577,936 | Waggoner | Dec. 11, 1951 |
| 2,587,930 | Uschmann | Mar. 4, 1952 |
| 2,594,693 | Smith | Apr. 29, 1952 |
| 2,600,457 | Wynstra | June 17, 1952 |
| 2,609,320 | Modigliani | Sept. 2, 1952 |
| 2,614,058 | Francis | Oct. 14, 1952 |
| 2,616,165 | Brennan | Nov. 4, 1952 |
| 2,653,112 | Roseveare | Sept. 22, 1953 |
| 2,656,873 | Stephens | Oct. 27, 1953 |
| 2,671,033 | Waggoner | Mar. 2, 1954 |
| 2,682,292 | Nagin | June 29, 1954 |
| 2,699,415 | Nachtman | Jan. 11, 1955 |
| 2,758,951 | Case | Aug. 14, 1956 |
| 2,887,454 | Toulman | May 19, 1959 |
| 2,915,806 | Grant | Dec. 8, 1959 |
| 2,938,821 | Nack | May 31, 1960 |

FOREIGN PATENTS

| | | |
|---|---|---|
| 849,842 | France | Aug. 28, 1939 |